(12) United States Patent
Chang et al.

(10) Patent No.: US 9,753,980 B1
(45) Date of Patent: Sep. 5, 2017

(54) M X N DISPATCHING IN LARGE SCALE DISTRIBUTED SYSTEM

(71) Applicant: EMC IP Holding Company LLC, Hopkinton, MA (US)

(72) Inventors: Lei Chang, Beijing (CN); Tao Ma, Beijing (CN); Zhanwei Wang, Beijing (CN); Luke Lonergan, San Carlos, CA (US); Lirong Jian, Beijing (CN); Lili Ma, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 173 days.

(21) Appl. No.: 13/840,948

(22) Filed: Mar. 15, 2013

Related U.S. Application Data

(60) Provisional application No. 61/769,043, filed on Feb. 25, 2013.

(51) Int. Cl.
*G06F 17/30* (2006.01)

(52) U.S. Cl.
CPC .. *G06F 17/30477* (2013.01); *G06F 17/30442* (2013.01); *G06F 17/30463* (2013.01); *G06F 17/30545* (2013.01)

(58) Field of Classification Search
CPC ......... G06F 17/30545; G06F 17/30463; G06F 17/30442; G06F 17/30498
See application file for complete search history.

(56) References Cited

U.S. PATENT DOCUMENTS

| | | | |
|---|---|---|---|
| 5,933,422 A | 8/1999 | Kusano et al. | |
| 7,599,969 B2 | 10/2009 | Mignet et al. | |
| 7,653,665 B1 | 1/2010 | Stefani et al. | |
| 7,921,130 B2 | 4/2011 | Hinshaw et al. | |
| 7,984,043 B1 | 7/2011 | Waas | |
| 8,266,122 B1 | 9/2012 | Newcombe et al. | |
| 8,359,305 B1 | 1/2013 | Burke et al. | |
| 8,572,051 B1 | 10/2013 | Chen et al. | |
| 8,713,038 B2 | 4/2014 | Cohen et al. | |
| 8,805,870 B2 | 8/2014 | Chen et al. | |
| 8,868,546 B2 | 10/2014 | Beerbower et al. | |
| 2003/0212668 A1* | 11/2003 | Hinshaw | G06F 17/30545 |
| 2004/0030739 A1 | 2/2004 | Yousefi'zadeh | |
| 2004/0186842 A1 | 9/2004 | Wesemann | |
| 2005/0289098 A1 | 12/2005 | Barsness et al. | |
| 2008/0059489 A1 | 3/2008 | Han et al. | |

(Continued)

FOREIGN PATENT DOCUMENTS

WO 2012050582 A1 4/2012

OTHER PUBLICATIONS

Brad Hedlund, "Understanding Hadoop Clusters and the Network," Bradhedlund.com, 2011, pp. 1-22. Available at http://bradhedlund.com/2011/09/10/understanding-hadoop-clusters-and-the-network/.

*Primary Examiner* — Alexander Khong

(74) *Attorney, Agent, or Firm* — Van Pelt, Yi & James LLP

(57) ABSTRACT

M×N dispatching in a large scale distributed system is disclosed. In various embodiments, a query is received. A query plan is generated to perform the query. A subset of query processing segments is selected, from a set of available query processing segments, to perform an assigned portion of the query plan. An assignment to perform the assigned portion of the query plan is dispatched to the selected subset of query processing segments.

17 Claims, 5 Drawing Sheets

(56) References Cited

U.S. PATENT DOCUMENTS

| | | |
|---|---|---|
| 2008/0082644 A1 | 4/2008 | Isard |
| 2008/0086442 A1 | 4/2008 | Dasdan |
| 2008/0120314 A1 | 5/2008 | Yang |
| 2008/0195577 A1* | 8/2008 | Fan et al. .................. 707/2 |
| 2008/0222090 A1 | 9/2008 | Sasaki |
| 2008/0244585 A1 | 10/2008 | Candea et al. |
| 2009/0043745 A1 | 2/2009 | Barsness et al. |
| 2009/0182792 A1 | 7/2009 | Bomma et al. |
| 2009/0234850 A1 | 9/2009 | Kocsis et al. |
| 2009/0254916 A1 | 10/2009 | Bose et al. |
| 2009/0271385 A1 | 10/2009 | Krishnamoorthy et al. |
| 2010/0223305 A1 | 9/2010 | Park et al. |
| 2010/0241827 A1 | 9/2010 | Yu et al. |
| 2011/0047172 A1 | 2/2011 | Chen et al. |
| 2011/0131198 A1 | 6/2011 | Johnson et al. |
| 2011/0228668 A1 | 9/2011 | Pillai et al. |
| 2011/0231389 A1 | 9/2011 | Surna et al. |
| 2011/0246511 A1 | 10/2011 | Smith et al. |
| 2011/0302164 A1 | 12/2011 | Krishnamurthy et al. |
| 2012/0036146 A1* | 2/2012 | Annapragada ................ 707/764 |
| 2012/0191699 A1 | 7/2012 | George et al. |
| 2012/0259894 A1 | 10/2012 | Varley et al. |
| 2013/0117237 A1 | 5/2013 | Thomsen et al. |
| 2013/0138612 A1 | 5/2013 | Iyer |
| 2013/0166523 A1 | 6/2013 | Pathak et al. |
| 2013/0346988 A1 | 12/2013 | Bruno |
| 2014/0019683 A1 | 1/2014 | Ishikawa |
| 2014/0067792 A1* | 3/2014 | Erdogan ........... G06F 17/30575 707/718 |
| 2014/0095526 A1* | 4/2014 | Harada ............. G06F 17/30545 707/764 |
| 2014/0108459 A1 | 4/2014 | Gaza et al. |
| 2014/0108861 A1 | 4/2014 | Abadi et al. |
| 2014/0122542 A1* | 5/2014 | Barnes .............. G06F 17/30126 707/822 |
| 2014/0136590 A1* | 5/2014 | Marty ..................... H04L 67/02 709/201 |
| 2014/0149357 A1 | 5/2014 | Gupta |
| 2014/0188841 A1* | 7/2014 | Sun .................... G06F 17/30483 707/718 |
| 2014/0195558 A1 | 7/2014 | Murthy et al. |
| 2014/0201565 A1 | 7/2014 | Candea et al. |

\* cited by examiner

M X N DISPATCHING IN LARGE SCALE DISTRIBUTED SYSTEM

CROSS REFERENCE TO OTHER APPLICATIONS

This application claims priority to U.S. Provisional Patent Application No. 61/769,043 entitled INTEGRATION OF MASSIVELY PARALLEL PROCESSING WITH A DATA INTENSIVE SOFTWARE FRAMEWORK filed Feb. 25, 2013 which is incorporated herein by reference for all purposes.

BACKGROUND OF THE INVENTION

Distributed storage systems enable databases, files, and other objects to be stored in a manner that distributes data across large clusters of commodity hardware. For example, Hadoop® is an open-source software framework to distribute data and associated computing (e.g., execution of application tasks) across large clusters of commodity hardware.

EMC Greenplum® provides a massively parallel processing (MPP) architecture for data storage and analysis. Typically, data is stored in segment servers, each of which stores and manages a portion of the overall data set.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

M×N dispatching in a large scale distributed system is disclosed. In various embodiments, a massively parallel processing database architecture is adapted to use with a large scale distributed storage system, such as Hadoop, at least in part by providing a massively parallel processing database system configured to dispatch to fewer than all segments comprising the MPP database processing tasks required to be performed to implement a query plan created to perform a query with respect to data stored in the large scale distributed storage.

In various embodiments, an M*N dispatching system for a large-scale parallel analytic database services is provided. The dispatching system schedules query execution units to a subset of the nodes in the cluster based on the data distribution and dynamic resource usage of the whole system.

Figure 1:
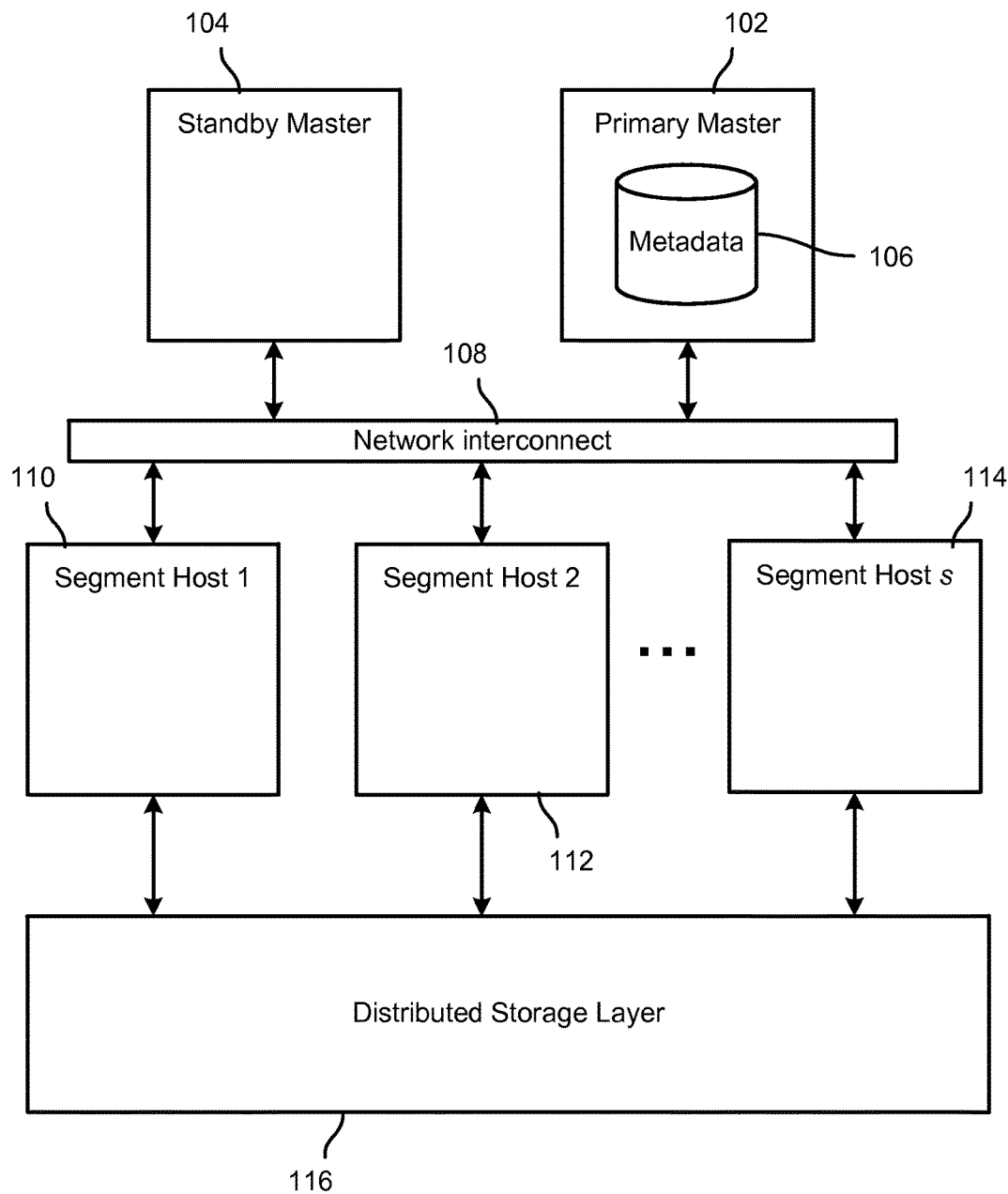
FIG. 1 is a block diagram illustrating an embodiment of a large scale distributed system.

FIG. 1 is a block diagram illustrating an embodiment of a large scale distributed system. In the example shown, the large scale distributed system includes a large cluster of commodity servers. The master hosts include a primary master 102 and a standby master 104. The primary master 102 is responsible for accepting queries; planning queries, e.g., based at least in part on system metadata 106, which in various embodiments includes information indicating where data is stored within the system; dispatching queries to segments for execution; and collecting the results from segments. The standby master 104 is a warm backup of the primary master 102. The network interconnect 108 is used to communicate tuples between execution processes. The compute unit of the database engine is called a "segment". Each of a large number of segment hosts, represented in FIG. 1 by hosts 110, 112, and 114, can have multiple segments. The segments on segment hosts 110, 112, 114, for example, are configured to execute tasks assigned by the primary master 102, such as to perform assigned portions of a query plan with respect to data stored in distributed storage layer 116, e.g., a Hadoop® or other storage layer.

When the master node 102 accepts a query, it is parsed and planned according to the statistics of the tables in the query, e.g., based on metadata 106. After the planning phase, a query plan is generated. A query plan is sliced into many slices. In query execution phase, a "gang" or other grouping of segments is allocated for each slice to execute the slices. In M*N dispatching, the size of the gangs is dynamically determined by using the knowledge of the data distribution and available resources.

Figure 2:
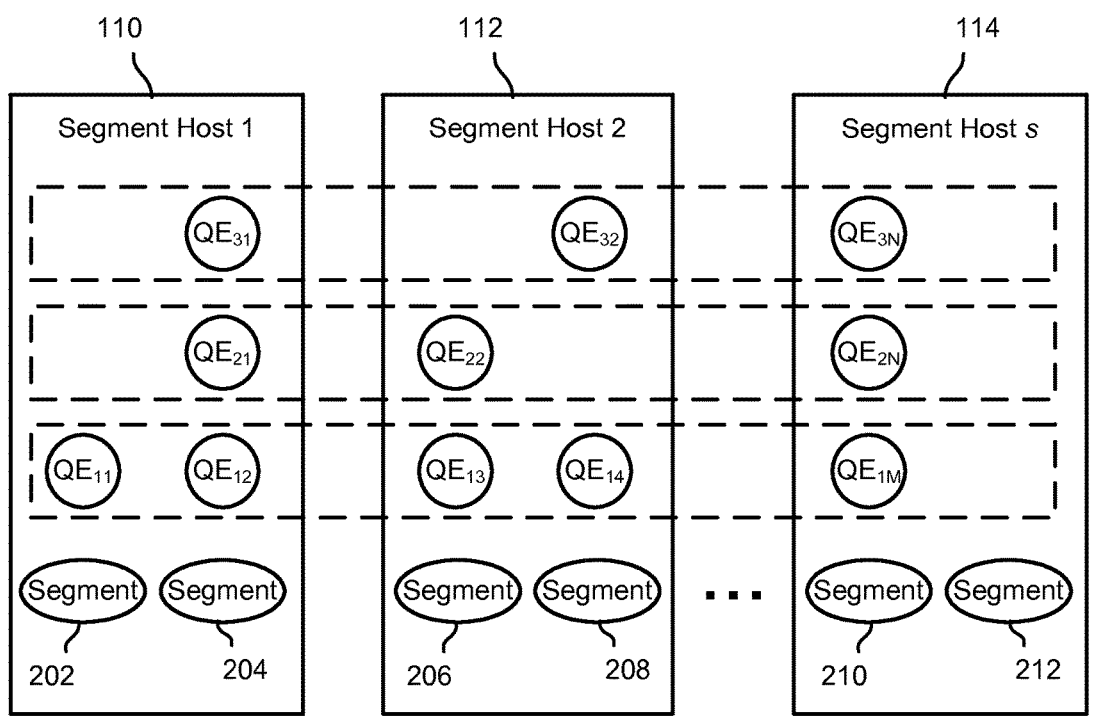
FIG. 2 is a block diagram illustrating an embodiment of a plurality of segment host systems.

FIG. 2 is a block diagram illustrating an embodiment of a plurality of segment host systems. In the example shown, each of segment hosts 110, 112, and 114 is shown as having two segments deployed thereon, specifically segments 202 and 204, 206 and 208, and 210 and 212, respectively. Each segment can run multiple "query execution" threads, indicated in FIG. 2 but the capital letters QE with numerical subscripts. In the example shown, each of the rectangles formed by dotted lines represents a "slice" or other portion of a query plan, each of which in the example shown as been assigned to be performed by a corresponding subset of the segments 202, etc. Specifically, the lower rectangle includes in this example tasks that have been dispatched to be performed by segments 202, 204, 206, 208, and 210, each of which is shown to be using a query execution process (QE) to perform the associated work. The middle rectangle in this example has been assigned to a "gang" that includes QE's associated with segments 204, 206, and 210, while the upper rectangle indicates a slice of the query plan that has been assigned to segments 204, 208, and 210.

In various embodiments, two kinds of strategies may be used for dispatching, i.e., assigning tasks comprising a slice of a query plan. The first is to use a fixed number (for example N) of QEs to execute each slice, in which N is equal to or less than the number of segments in the cluster. The scheduling algorithm to match QEs to segments considers the dynamically available resources and the data locality for scan nodes.

Given the total number of QEs slots available for the query, the second strategy allows variable size gangs. In typical analytical queries, high-level slices often do less work than low-level slices due to the bottom-up processing nature of a query plan. By assigning more QEs to perform low-level slices than less processing intensive upper-level slices, resources can be more fully utilized.

For gangs that execute scan operators, one technique is used to optimize the performance according to data locality. Typical underlying distributed system store large files in chunks, and for each chunk, it stores several replicas. Data locality sometimes contributes a lot to query performance, e.g., if the network by which nodes communicate is not good. In some embodiments, an attempt is made to schedule QEs to perform tasks at nodes located near to where the corresponding data is stored.

Figure 3:
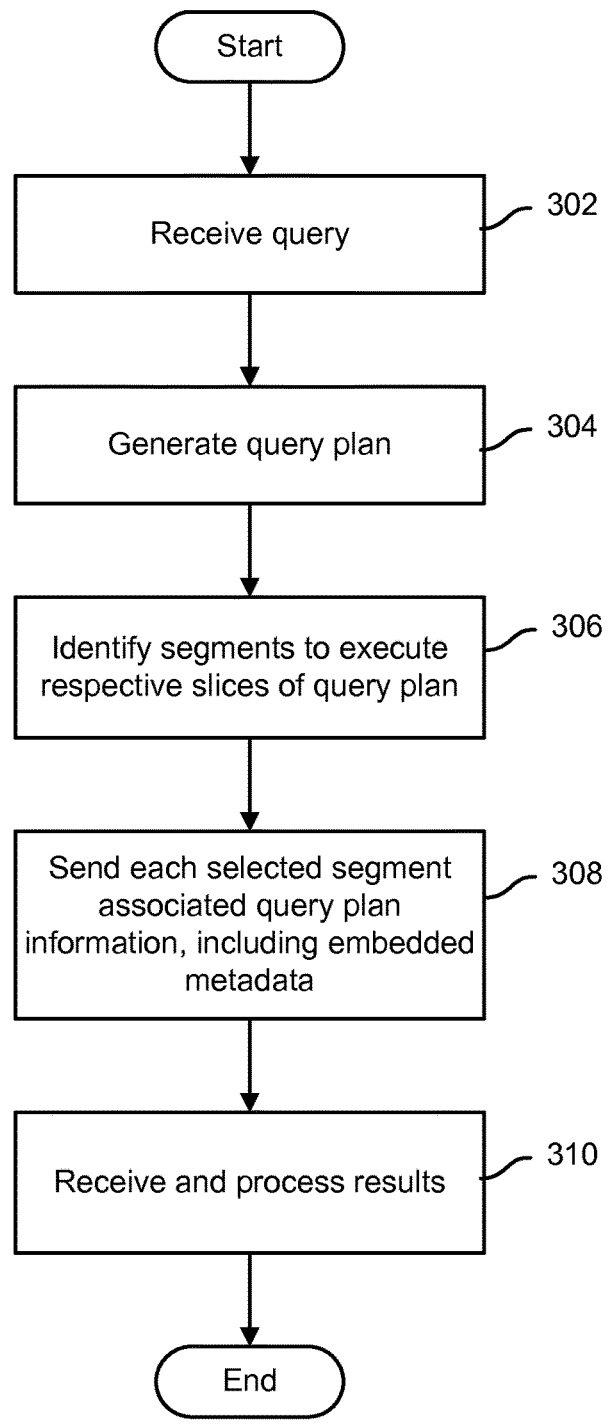
FIG. 3 is a flow chart illustrating an embodiment of a database query processing process.

FIG. 3 is a flow chart illustrating an embodiment of a database query processing process. In some embodiments, a master node, such as primary master 102 of FIG. 1, implements the process of FIG. 3. In the example shown, a query is received (302). A query plan is generated (304). The plan is divided into a plurality of slices, and for each slice a corresponding set of segments ("gang") is identified to participate in execution of that slice of the query plan (306). For each slice of the query plan, the segments selected to perform processing required by that slice are sent a communication that includes both the applicable portion of the plan to be performed by that segment and metadata that may be required by a receiving segment to perform tasks assigned to that segment (308). In some embodiments, the metadata included in the query plan slice and/or other communication sent to the respective segments selected to participate in execution of that slice of the plan includes metadata from a central metadata store, e.g., metadata 106 of FIG. 1, and includes information indicating to the segment the location of data with respect to which that segment is to perform query plan slice related processing. In past approaches, typically a segment would store and manage a corresponding portion of the overall data, and sending metadata to perform query plan related tasks would not typically have been necessary. In some embodiments, the ability to embed required metadata, such as data indicating where data required to perform an assigned part of a query plan is located, facilitates M*N dispatching of tasks, i.e., dispatching tasks to a subset of available segments, as disclosed herein. Query results are received from the respective segments to which query tasks were dispatched, and processed to generate, e.g., at the master node, a master or overall response to the query (310).

Figure 4:
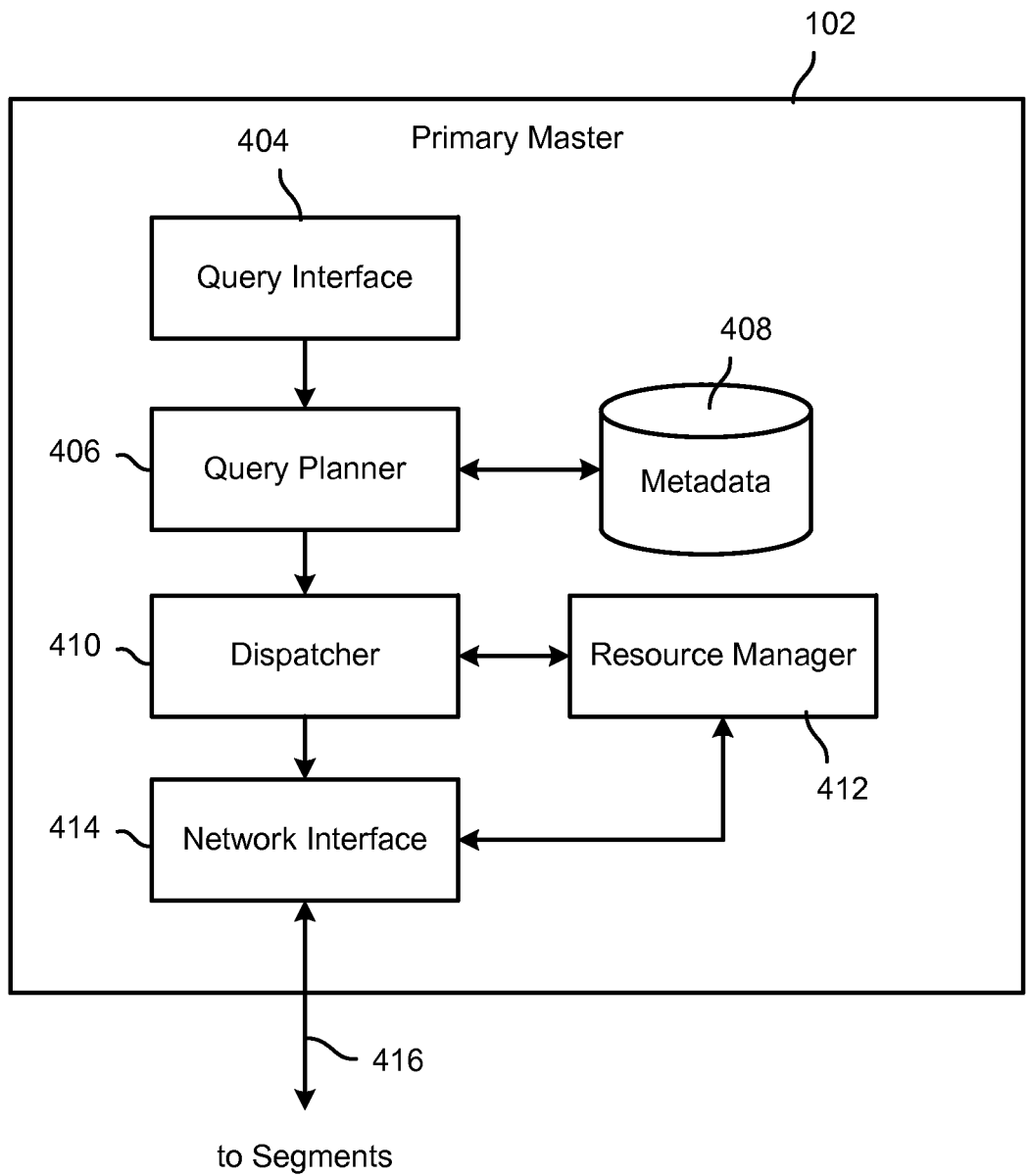
FIG. 4 is a block diagram illustrating an embodiment of a primary master system.

FIG. 4 is a block diagram illustrating an embodiment of a primary master system. In the example shown, the primary master 102 comprises one or more processors, memory, and/or non-volatile storage device, such as a disk drive (not shown). The processor(s) is/are configured in the example shown to provide a query interface 404, for example a user interface code configured to receive a query, such as one entered via an input device such as a keyboard, either locally or remotely and sent to the primary master 102, e.g., via a network. The query interface 404 provides query data to a query planner 406 configured to use metadata 408 to create a query plan. The query plan is divided into independently executable subparts (e.g., slices). A dispatcher 410 uses information about segment availability, load, etc., from a resource manager 412 to select for each slice of the query plan a corresponding subset of segment to perform processing required by that slice. The dispatcher 410 forms and sends to each of the selected segments, via a network interface 414 (e.g., a network interface card or NIC) and a network connection 416, a communication that includes data indicating the processing to be performed by that segment and metadata to be used to perform assigned processing.

Figure 5:
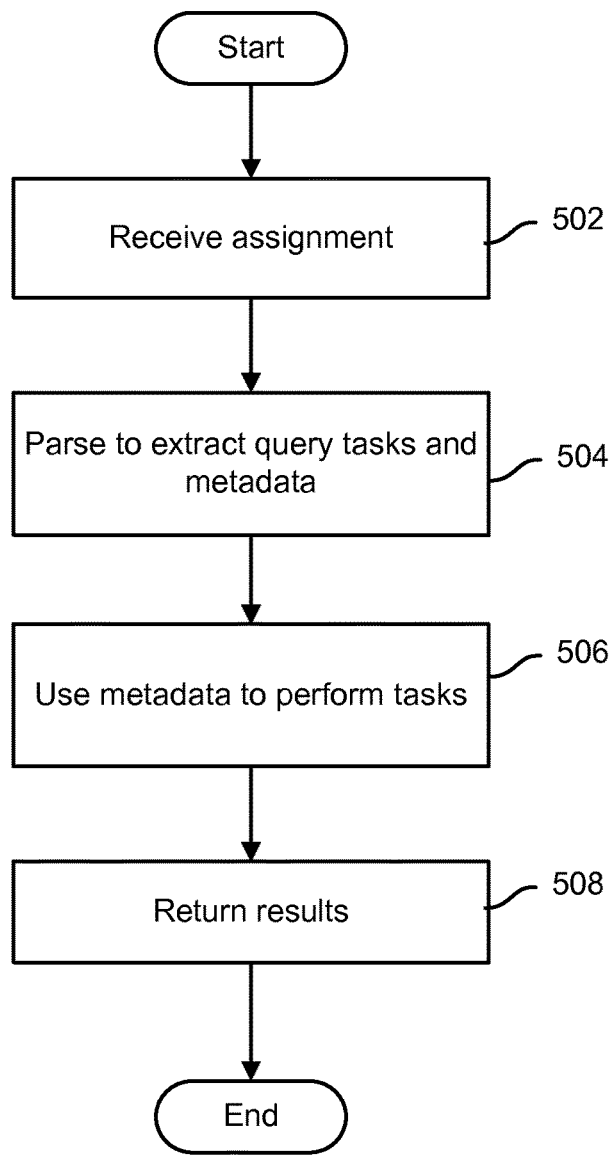
FIG. 5 is a flow chart illustrating an embodiment of a query task execution process.

FIG. 5 is a flow chart illustrating an embodiment of a query task execution process. In various embodiments, the process of FIG. 5 may be implemented on each of a plurality of segments comprising a large scale distributed system. In the example shown, an assignment associated with a slice or other portion of a query plan is received (502). The assignment is parsed to extract query tasks to be performed by the receiving segment and embedded metadata to be used to perform the assigned query tasks (504). The extracted metadata is used to perform the assigned tasks (506). Results determined by the segment are returned, e.g., to a master node from which the assignment was received (508).

In various embodiments, the M*N dispatching disclosed herein provide much more flexibility for resource management and scale much better than traditional methods. Segments can be added and/or removed from availability, through failure or otherwise, without affecting the ability and flexibility of the large scale distributed system to perform queries or other tasks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a query;
   generating, by a master node, a query plan to perform the query, wherein the generating of the query plan includes dividing the query plan into at least a first portion and a second portion, and wherein the master node comprises one or more hardware processors;
   selecting, by the master node, from a set of available query processing segments a first subset of query processing segments to perform a first assigned portion of the query plan corresponding to the first portion of the query plan, and a second subset of query processing segments to perform a second assigned portion of the query plan corresponding to the second portion of the query plan, wherein at least one segment of the set of available query processing segments is included in the first subset and the second subset of query processing segments, wherein a first number of segments selected to perform the first portion of the query plan is dynamically determined according to one or both of (1) data locality of data corresponding to the first portion of the query plan associated with the query in relation to the first subset of query processing segments, and (2) available resources, wherein the first subset of query processing segments is selected based at least in part on a co-locality of one or more of the selected query processing segments with data with which the assigned portion of the query plan is associated, and wherein the first number of segments is selected to perform the first portion of the query plan and a second number of segments, different from the first number, is selected to perform the second portion of the query plan; and dispatching to the selected first subset of query processing segments an assignment to perform the first assigned portion of the query plan, wherein the dispatching of the assignment to perform the first assigned portion of the query plan includes providing to the selected first subset of query processing segments with corresponding metadata that is obtained from a central metadata store, wherein the metadata provided to the corresponding selected first subset of query processing segments is determined to be used to perform the first assigned portion of the query plan.

2. The method of claim 1, wherein the dividing the query plan into at least a first portion and a second portion includes dividing the query plan into a plurality of independently executable slices.

3. The method of claim 1, wherein selecting the first subset of query processing segments includes receiving from a resource manager an indication of a degree of availability of processing segments included in the set of available query processing segments.

4. The method of claim 1, wherein the first subset of query processing segments is selected according to a determination for each of a plurality of portions of the query plan a corresponding number of segments to be assigned to perform that portion.

5. The method of claim 1, wherein the assignment comprises a network communication sent via a network interconnect.

6. The method of claim 1, wherein the assignment includes embedded metadata to be used to perform one or more tasks associated with the assigned portion of the query plan.

7. The method of claim 1, wherein segments comprising the subset of query processing segments are associated with one or more segments hosts, each of which is configured to provide one or more processing segments.

8. The method of claim 1, wherein the assignment includes the metadata, wherein the metadata indicates a location, within a distributed storage layer, of data associated with the assignment.

9. The method of claim 8, wherein the location includes identification of a table of data to be search in connection with the assignment.

10. A system, comprising:
a communication interface; and
one or more hardware processors coupled to the communication interface and configured to:
  receive a query;
  generate a query plan to perform the query, wherein the query plan is generated such that the query plan is divided into at least a first portion and a second portion;
  select from a set of available query processing segments a first subset of query processing segments to perform a first assigned portion of the query plan, corresponding to the first portion of the query plan, and a second subset of query processing segments to perform a second assigned portion of the query plan corresponding to the second portion of the query plan, wherein at least one segment of the set of available query processing segments is included in the first subset and the second subset of query processing segments, wherein a first number of segments selected to perform the first portion of the query plan is dynamically determined according to one or both of (1) data locality of data corresponding to the first portion of the query plan associated with the query in relation to the first subset of query processing segments, and (2) available resources, wherein the first subset of query processing segments is selected based at least in part on a co-locality of one or more of the selected query processing segments with data with which the assigned portion of the query plan is associated, and wherein the first number of segments is selected to perform the first portion of the query plan and a second number of segments, different from the first number, is selected to perform the second portion of the query plan; and
  dispatch to the selected first subset of query processing segments, via the communication interface, an assignment to perform the first assigned portion of the query plan, wherein to dispatch the assignment to perform the first assigned portion of the query plan includes providing to the selected first subset of query processing segments with corresponding metadata that is obtained from a central metadata store, wherein the metadata provided to the corresponding selected first subset of query processing segments is determined to be used to perform the first assigned portion of the query plan.

11. The system of claim 10, wherein the dividing the query plan into at least a first portion and a second portion includes dividing the query plan into a plurality of independently executable slices.

12. The system of claim 10, wherein selecting the first subset of query processing segments includes receiving from a resource manager an indication of a degree of availability of processing segments included in the set of available query processing segments.

13. The system of claim 10, wherein the first subset of query processing segments is selected according to a determination for each of a plurality of portions of the query plan a corresponding number of segments to be assigned to perform that portion.

14. The system of claim 10, wherein the assignment includes the metadata, wherein the metadata is to be used to perform one or more tasks associated with the assigned portion of the query plan.

15. A computer program product embodied in a tangible, non-transitory computer readable storage means, comprising computer instructions for:
receiving a query;
generating a query plan to perform the query, wherein the generating of the query plan includes dividing the query plan into at least a first portion and a second portion;
selecting from a set of available query processing segments a first subset of query processing segments to perform a first assigned portion of the query plan corresponding to the first portion of the query plan, and a second subset of query processing segments to perform a second assigned portion of the query plan corresponding to the second portion of the query plan, wherein at least one segment of the set of available query processing segments is included in the first subset and the second subset of query processing segments, wherein a first number of segments selected to perform the first portion of the query plan is dynamically determined according to one or both of (1) data locality of data corresponding to the first portion of the query plan associated with the query in relation to the first subset of query processing segments, and (2) available resources, wherein the first subset of query processing segments is selected based at least in part on a co-locality of one or more of the selected query processing segments with data with which the assigned portion of the query plan is associated, and wherein the first number of segments is selected to perform the first portion of the query plan and a second number of segments, different from the first number, is selected to perform the second portion of the query plan; and dispatching to the selected first subset of query processing segments an assignment to perform the first assigned portion of the query plan, wherein the dispatching of the assignment to perform the first assigned portion of the query plan includes providing to the selected first subset of query processing segments with corresponding metadata that is obtained from a central metadata store, wherein the metadata provided to the corresponding selected first subset of query processing segments is determined to be used to perform the first assigned portion of the query plan.

16. The computer program product of claim 15, wherein the first subset of query processing segments is selected according to a determination for each of a plurality of portions of the query plan a corresponding number of segments to be assigned to perform that portion.

17. The method of claim 1, wherein the first subset of query processing segments and the second subset of query processing segments include at least a first segment.

\* \* \* \* \*